Oct. 26, 1954

C. WILLIAMS ET AL 2,692,924

WARNING DEVICE FOR MINERS

Filed July 17, 1950

Charlie Williams
Harold A. Lee
INVENTORS

BY Clarence A. O'Brien
and Harvey B. Jacobson
Attorneys

Oct. 26, 1954   C. WILLIAMS ET AL   2,692,924
WARNING DEVICE FOR MINERS
Filed July 17, 1950   2 Sheets-Sheet 2
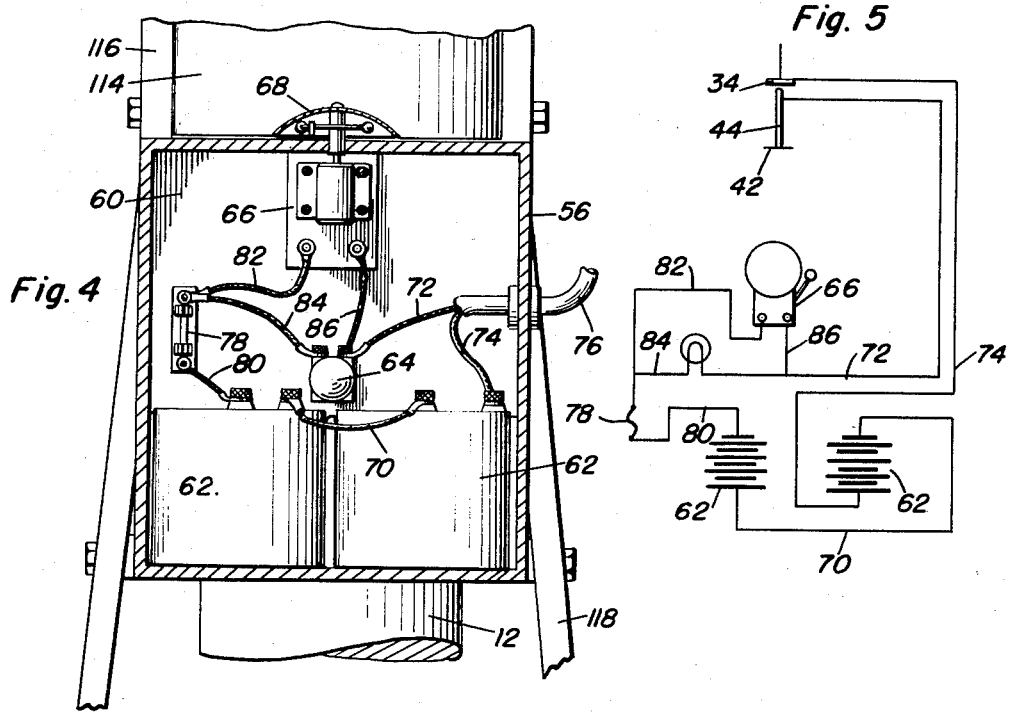
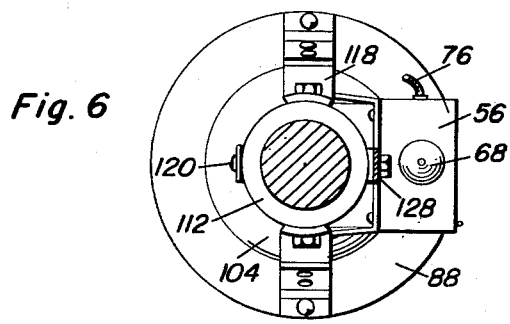
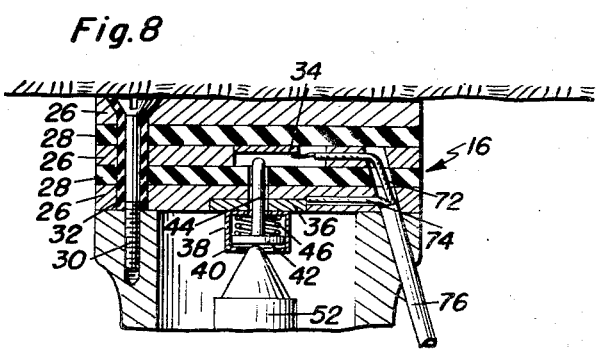
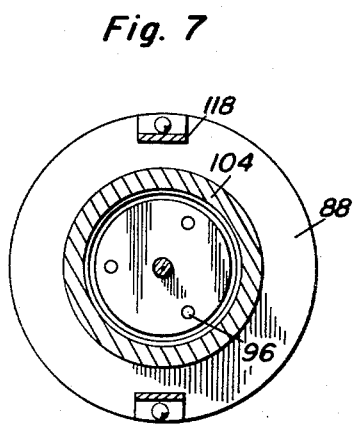
Charlie Williams
Harold A. Lee
INVENTORS

Patented Oct. 26, 1954

2,692,924

UNITED STATES PATENT OFFICE 2,692,924

WARNING DEVICE FOR MINERS

Charlie Williams and Harold A. Lee,
Iaeger, W. Va.

Application July 17, 1950, Serial No. 174,264

2 Claims. (Cl. 200—85)

This invention relates to new and useful improvements in mine safety devices, and more particularly pertains to a device for supporting mine ceilings and signalling the settling thereof.

The primary object of this invention is to provide a positive ceiling support which will signal a predetermined settling thereof.

Another important object of this invention is to provide a device capable of realizing the preceding objects, which is adaptable for use with various ceiling heights, and which will visually indicate the extent of ceiling collapse prior to the condition becoming sufficiently aggravated to signal the warning of a dangerous condition.

Another important object of this invention is to provide a device of this character that will satisfy mine safety regulations and laws relating thereto, and which will not constitute a hazard in itself in gaseous mines with reference to initiating explosions.

A meritorious feature of the present invention resides in the positioning of the switch within the support and the sealing of the batteries and the signalling device to prevent the ignition of mine gases.

Another important feature of this invention resides in the provision of an indicator to adjustably predetermine the amount of ceiling drop required to actuate the warning device as well as indicating the amount of ceiling drop prior to the actuation of the warning device.

A final important feature of the present invention to be specifically enumerated herein resides in the means provided for making fine adjustments of the support to conform to ceiling heights and the desired amount of ceiling drop to actuate the warning device, together with the sturdy means provided to maintain the support in adjusted positions.

These, together with various ancillary features and objects of the invention which will later become apparent as the following description proceeds, are attained by the present invention, a preferred embodiment of which has been illustrated by way of example only in the accompany drawings, wherein:

Figure 4 is a detail sectional view taken upon the plane of the section line 4—4 of Figure 2;

Figure 5 is an electrical diagram of the circuit employed in the present invention;

Figure 6 is a horizontal sectional view of the present invention taken upon the plane of the section line 6—6 of Figure 2;

Figure 7 is another horizontal sectional view of the present invention, this view being taken upon the plane of the section line 7—7 of Figure 2; and Figure 8 is a detailed sectional view of the present invention, this view being taken upon the plane of the section line 9—9 of Figure 1.

Reference is now made more specifically to the accompanying drawings, wherein like numerals designate similar parts throughout the various views, wherein the safety device constituting the subject matter of this invention is designated generally at 10.

Figure 1:
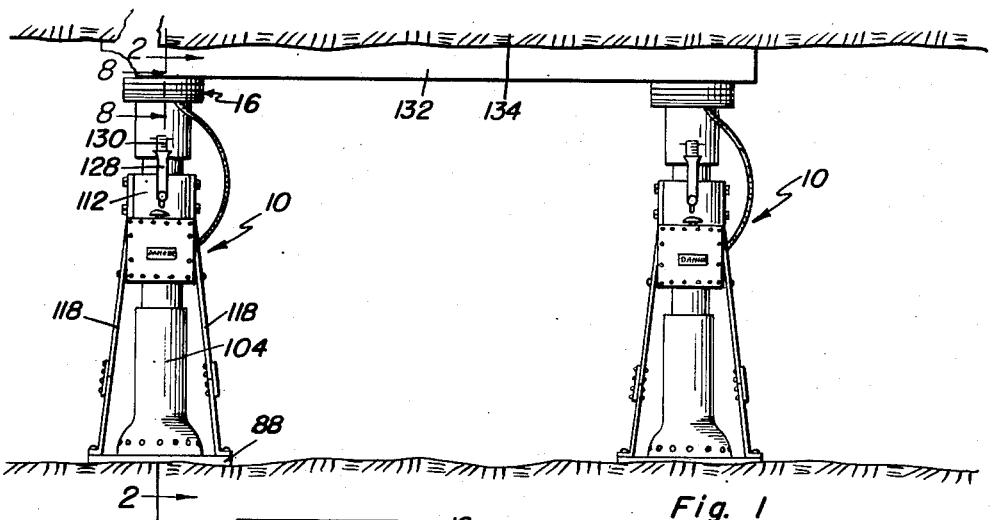
Figure 1 is a side elevational view showing the present invention in use in a mine.

The device 10 includes a cylindrical standard 12 having an opening 14 in its upper end. A cap or head assembly indicated generally at 16 is provided at the upper end of the standard 12, which assembly includes a sleeve 18 slidably embracing the upper end of the standard 12 so that the head assembly 16 and the standard 12 constitute a pair of telescopic members.

Figure 2:
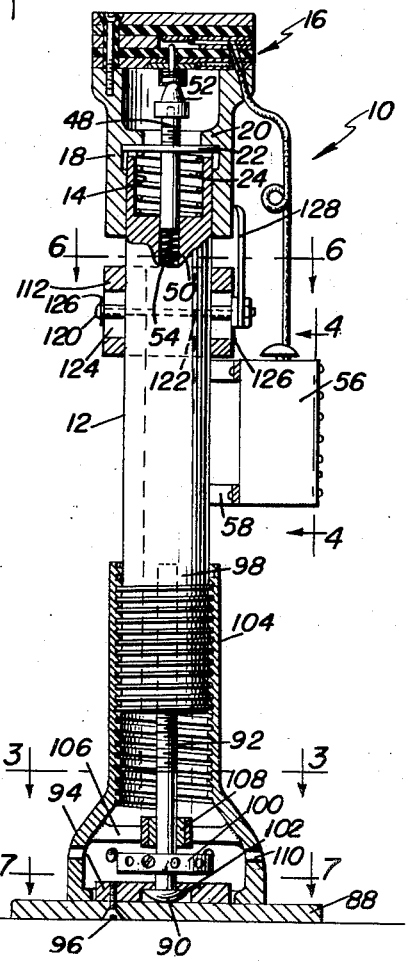
Figure 2 is a side elevational view of one of the supports shown in Figure 1, this view being partially shown in central section upon the plane of the section line 2—2 of Figure 1.
Figure 3:
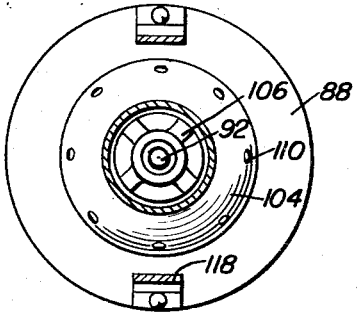
Figure 3 is a horizontal sectional view taken upon the plane of the section line 3—3 of Figure 2.

The interior of the sleeve 18 is provided with an annular rib 20, and a disk 22 is slidably received in the sleeve 18 between the upper end of the standard 12 and the rib 20, and a compression spring 24 is seated in the opening 14 against the under side of the disk 22 to urge the latter upwardly and through its engagement with the rib 20, the entire head assembly 16 upwardly, as will be readily seen upon reference to Figure 2.

As best shown in Figure 8, the head assembly 16 includes a plurality of plates 26 between which is interdigitated a pair of insulating plates 28 closing the upper end of the sleeve 18, the plates 26 and 28 being secured to the sleeve 18 by means of fasteners 30 extending through insulating bushings 32 inserted in suitable registering openings in the plates 26 and 28. An electric switch is provided in the head assembly 16 which includes fixed contacts 34 and 36 suitably secured to the plates 26 and 28. Means is provided for bridging the contacts 34 and 36 which include a metallic sleeve 38 having a lower inturned edge 40 carried by the contact 36, in which sleeve is slidably positioned a disk 42 which has attached thereto a movable contact element 44, which, as clearly shown in Figure 8, is adapted to slide upwardly through suitable apertures in the plates 26 and 28 so as to contact the fixed contact 34, a compression spring 46 being received between the fixed contact 36 and the disk 42 for yieldingly urging the contact 44 downwardly away from the contact 34. As will be understood, the sleeve 38, the disk 42, and the spring 46 are of electrically conductive material so that the movable contact 44 is continuously in electrical contact with the fixed contact 36, whereby the contacts 34 and 36 are bridged upon a predetermined upward movement of the movable contact 44.

The switch is adapted to be closed upon a predetermined downward movement of the head assembly 16 on the standard 12 by means of a rod 48 that is slidably received in an axial recess 50 in the upper end of the standard 12 that extends upwardly toward the switch, the rod 48 having provided on its upper end a threadingly adjustable cap construction 52 for engagement with the disk 42, and a compression spring 54 is disposed in the axial recess 50 and seated against the lower end of the rod 48, so that upon downward movement of the head assembly 16 the disk 42 will contact the cap construction 52 to cause the movable contact 44 to bridge the contacts 34 and 36 by the compression of spring 46 and additional movement of the head 16 relative to the standard 12 is taken up through the compression of the spring 54.

A signalling device housing 56 is supported on the standard 12 by means of brackets 58 which is sealed to provide an air-tight chamber 60 therein. Mounted within the housing 56 are batteries 62 and a signal light 64 adapted to be seen through a transparent portion of the housing. Also mounted in the housing 56 is the actuating element 66 of a radial type valve having the sounding portion 68 thereof disposed on the top of the housing 56 in such a manner that the ingress of air is not permitted to the actuating element 66, as will be understood. The electrical circuit for the signal light and the bell will be best understood upon reference to Figures 4, 5 and 8, wherein it will be seen that the batteries 62 are connected in series by means of a lead 70. Conductors 72 and 74 are connected to the fixed contacts 34 and 36 and extend outwardly from the head construction 16 and vent into the chamber 60. A protective conduit 76 receives the exposed portions of the conductors 72 and 74 extending between the head assembly 16 and the housing 56, and the ends of the conduit 76 is received in the head assembly 16 and the housing 56 in such a manner as not to permit the ingress of air into either the head assembly 16 or the housing 56. The end of the conductor 74 received in the chamber 60 is secured to one of the battery terminals, while the end of the conductor 72 that is received within the housing 56 is connected to the signal light 64, as clearly shown in Figure 4. The other end of the battery 72 connected in series relation by the conductor 70 from that connected to the conductor 74 is connected to a fuse 78 by a conductor 80. The bell and the signal light are connected in parallel between the fuse 78 and the conductor 72 by means of conductors 82 and 84 connecting the fuse 78 to the bell and the signal light respectively, the bell, in turn, being connected to the conductor 72 by an additional conductor 86. It will thus be seen that upon bridging the contacts 34 and 36, both the signal light 64 and the bell will be actuated, and that by virtue of the bell and the signal light being in parallel, the failure of either one of these devices will not affect the operation of the other, and that the switch and all the connections of the electrical circuit are maintained in sealed relation with respect to the outside atmosphere, so that, upon use of the device in a gaseous mine, those electric sparks that may possibly be generated thereby cannot cause an explosion.

A base plate 88 is provided upon which rests the lower headed end 90 of an adjusting post 92. The post 92 is rotatable about its vertical axis and is held in assembled relation with respect to the plate 88 by means of a washer plate 94 that is in turn secured to the base plate 88 by means of fasteners 96, as clearly shown in Figure 2 of the drawings. The upper portion of the post 92 is threaded and threadingly received in a recess bore 98 opening into the bottom of the standard 12, so that, upon rotation of the post 92, raising or lowering of the standard 12 may be effected. In order to effect such rotation of the post 92, an annular plate 100 is fixedly secured to the post 92 adjacent its lower end, which plate 100 is provided with a plurality of radial bores 102 into which bores a rod, not shown, may be inserted for rotating the post 92.

The lower end of the standard 12 is externally threaded and threadingly received in an internally threaded standard support 104. The lower end of the support 104 is radially enlarged and normally rests upon the base plate 88 to support the standard 12, as best shown in Figure 2. The enlarged portion of the support 104 is provided with a spider 106 which carries a bearing 108 that rotatably receives the post 92. In addition, the enlarged portion of the support 104 is provided with a plurality of circumferentially spaced radial apertures 110 for receiving a rod, not shown, for effecting raising of the support 104 with respect to the standard 12, when the latter is resting upon the post 92, as will be readily understood.

An additional bracing structure for the standard 12 is provided which includes a sleeve 112 slidably embracing the standard 12 which is secured to the base plate 88 by means of brace straps 118. A bolt 120 extends through a transverse bore 122 extending through the standard 12 and is slidably received in slots 124 provided in the sleeve 112, the bolt 120 being retained in position by washers 126 slidably embracing the opposite sides of the sleeve 112. One end of the bolt 120 carries an indicating arm 128 that extends upwardly along the side of the sleeve 18, and indicia 130 are provided on the sides of the sleeve 18 that cooperate with the indicator arm 128 to indicate the relative position of the head assembly 16 and the standard 12.

It will be readily understood that upon predetermined relative positions of the head assembly 16 and the standard 12 that the switch will be actuated and that the annular rib 20 will rest upon the upper end of the standard 12 to positively prevent further downward movement of the head assembly 16 with respect to the standard 12. It is preferred that the indicia 130 have suitable markings to indicate such relative positions.

The use of the invention will be readily understood. In positioning the device, it is first placed in an upright position below the point of the ceiling to be supported. The support 104 is then turned to raise the same above the base plate 88 so that access may be had to the plate 100 for turning the post 92, whereupon the post 92 is turned until the predetermined amount of settling of the ceiling, as shown by the indicating arm 128, will cause the switch to close. With the post 92 thus adjusted, the support 104 is turned about the standard 12 until it rests upon the base plate 88. It is preferred that the devices of the present invention be used in pairs as shown in Figure 1, where it will be seen that a header 132 is placed below the ceiling 134 and the devices 10 are positioned below the opposite ends of the header 132, so that the settling of any portion of the ceiling 134 intermediate the ends of the header 132 will actuate the warning devices of the invention, and by virtue of the positive limitation of the contraction omitted by the devices, the arrangement of the devices 10 and the header 132 constitute a safety collar.

Since, from the foregoing, the construction and advantages of this warning device are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. For use in a mine safety device having an adjustable standard with a head including a sleeve slidable on one end of said standard and resilient means urging expanding movement of said head, a switch comprising a pair of conducting plates mounted in spaced insulated relation and adapted to be secured in said head, a movable contact slidably mounted on one of said plates and operable to be moved into contact with the other of said plates, resilient means urging said movable contact out of contact with said other plate, a rod adapted to be mounted in said standard in extending relation toward said movable contact.

2. In a mine safety device a switch actuating device having an adjustable support standard with a head including a sleeve slidable on the upper end of said standard and resilient means urging upward movement of the head, a switch comprising upper and lower fixed contacts adapted to be mounted in spaced insulated relation in said head, a bridging contact mounted on one of said fixed contacts and movable into engagement with the other fixed contact, biasing means urging said bridging contact out of engagement with said other fixed contact, an actuating rod adapted to be mounted in said standard for engagement with said bridging contact.

References Cited in the file of this patent

UNITED STATES PATENTS

| Number | Name | Date |
|---|---|---|
| 1,018,328 | Lee et al. | Feb. 20, 1912 |
| 1,737,514 | Nikolish | Nov. 26, 1929 |

FOREIGN PATENTS

| Number | Country | Date |
|---|---|---|
| 11,916 | Great Britain | May, 14, 1914 |
| 1,119 | Great Britain | of 1915 |